United States Patent
Ge et al.

(10) Patent No.: US 9,811,525 B1
(45) Date of Patent: Nov. 7, 2017

(54) MESSAGE AND ATTACHMENT DELETION

(71) Applicant: Facebook, Inc., Menlo Park, CA (US)

(72) Inventors: Ruifang Ge, Palo Alto, CA (US);
Rahul Narayan Iyer, Palo Alto, CA (US); Jiakai Liu, Palo Alto, CA (US);
Kannan Muthukkaruppan, Union City, CA (US); Dylan Nugent, Chicago, IL (US); Anshuman Singh, Sunnyvale, CA (US); Karthik Ranganathan, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 454 days.

(21) Appl. No.: 13/827,740

(22) Filed: Mar. 14, 2013

(51) Int. Cl.
*G06F 7/00* (2006.01)
*G06F 17/00* (2006.01)
*G06F 17/30* (2006.01)

(52) U.S. Cl.
CPC .............................. *G06F 17/30117* (2013.01)

(58) Field of Classification Search
USPC ........................................................ 707/662
See application file for complete search history.

(56) References Cited

U.S. PATENT DOCUMENTS

| 8,484,259 B1* | 7/2013 | Makkar et al. ............... 707/827 |
| 2003/0192039 A1* | 10/2003 | McConnell .................. 717/171 |
| 2010/0011031 A1* | 1/2010 | Huang .................. G06F 21/552 |
| | | 707/E17.007 |
| 2010/0138500 A1* | 6/2010 | Consul et al. ................ 709/206 |
| 2010/0250497 A1* | 9/2010 | Redlich et al. .............. 707/661 |
| 2013/0036427 A1* | 2/2013 | Chen ....................... G06F 9/546 |
| | | 719/312 |

* cited by examiner

*Primary Examiner* — Muluemebet Gurmu
(74) *Attorney, Agent, or Firm* — Perkins Coie LLP

(57) ABSTRACT

The disclosed techniques provide systems and methods for deletion of end-user messages, message threads, attachments, and/or other message information. More specifically, a key-value store residing in computer memory on the storage system is described. Each value in the key-value store is indexed by a key and structured to include multiple column portions associated with multiple column families. In one embodiment, a deletion column family having an associated retention policy for data stored therein is defined.

16 Claims, 10 Drawing Sheets

MESSAGE AND ATTACHMENT DELETION

FIELD OF THE INVENTION

The present invention generally relates to information management. More specifically, various embodiments of the present invention relate to systems and methods for deletion of messages and management of attachments.

BACKGROUND

End-user data may be stored by various organizations. For example, end-user data can include, but is not limited to, address information, credit card information, photographs, e-mails, healthcare records, financial records, electronic documents, messages such as instant messages, associations with other end-users, and other types of information.

An end-user may request to delete a message, a message thread (including various related messages), or even an entire mailbox (or account). Storage systems typically deal with these message deletions in a variety of ways. For example, some storage systems mark messages as deleted but do not actually delete the messages upon the reception of a deletion request. In this case, the messages marked as deleted are not displayed and/or otherwise provided to an end-user when the end-user requests to view messages in his/her mailbox. Other storage systems can permanently delete a message upon the reception of a deletion request. In this case, the messages are immediately deleted.

Messages can include one or more attachments. Typically, the attachments are larger than messages, and thus, the attachments can be stored in a different data store (e.g., database or storage system) than the messages. In addition, for storage efficiency purposes it is often desirable to store a single copy of an attachment for all of the end-users that are associated with the message (e.g., at least one end-user that sent the message and one end-user that receives the message). However, because multiple users are associated with a single message, deleting an attachment when one user deletes a message may not always be appropriate.

Overall, the examples herein of some prior or related systems and their associated limitations are intended to be illustrative and not exclusive. Upon reading the following, other limitations of existing or prior systems will become apparent to those of skill in the art.

SUMMARY

This summary is provided to introduce certain concepts in a simplified form. The concepts are further described in the Detailed Description below and the drawings. This summary is not intended to identify essential features of the claimed subject matter or to limit the scope of the claimed subject matter.

The techniques introduced herein provide systems and methods for deletion of end-user messages, message threads, and/or other message information, and management of attachments. More specifically, a key-value store residing in computer memory on the storage system is described. Each value in the key-value store is indexed by a key and structured to include multiple column portions associated with multiple column families. In one embodiment, a deletion column family having an associated retention policy for data stored therein is defined. The systems and procedures described herein allow messages and/or other message information stored in the deletion column of a particular structured value to be temporarily accessible from the key-value store during a retention period but removed after the retention period has elapsed.

In one embodiment, the messages can include one or more attachments that can be encrypted and stored separately from the messages. More specifically, the messages are stored in a message data store with a reference to the attachment in an attachment data store and an encryption key that is used to decrypt the attachment. As discussed above, attachments are typically associated with multiple users. Once a message is deleted, so is the pointer to any associated attachment and the encryption key for the associated attachment. Accordingly, if a message associated with multiple users is deleted by each of those users, an attachment associated with the message is no longer accessible and/or otherwise traceable to an individual end-user because the decryption key is no longer available.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

One or more embodiments of the present invention are illustrated by way of example and not limitation in the figures of the accompanying drawings, in which like references indicate similar elements.

Figure 1:
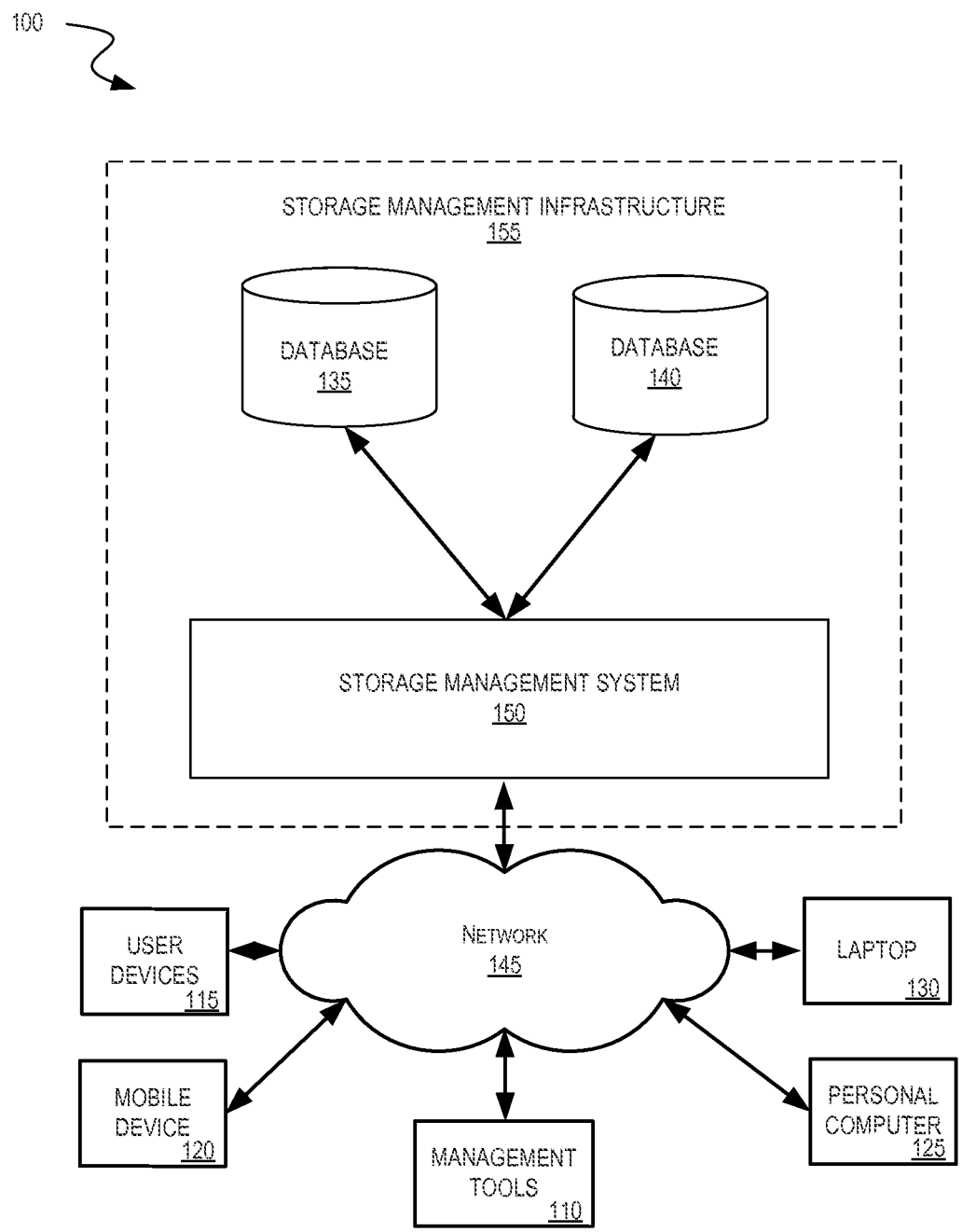
FIG. 1 depicts a block diagram illustrating an example of a networked-based environment in which some embodiments of the present invention may be utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention generally relate to systems and methods for deletion of end-users messages, message threads, and management of attachments, while providing flexibility when dealing with messages that are inadvertently deleted. More specifically, messages and/or other message information stored in the deletion column of a particular structured value is temporarily accessible from the key-value store during a retention period but removed after the retention period has elapsed.

In one embodiment, the message information can include metadata describing various actions that can occur with respect to messages and/or message threads. The actions can be represented in an actions log stored in an actions column in the key-value store. The actions log can consist of a base snapshot and various mutations, wherein every mutation results in the actions log. Additionally, various checkpoints may be kept within the log in order to identify various points in time in the actions log. The actions (or mutations) can include, but are not limited to, adding a message, deleting a message, marking a message as read, etc. The metadata can be added to the deletion column from the actions column that describes a log of the various actions associated with the messages and/or threads. After a retention period, the metadata and any messages associated with the metadata can be deleted.

In one embodiment, attachments are encrypted and the key is stored with the associated message(s). Once the message(s) are deleted, so are the pointers to any associated attachment and the encryption key for the attachment. Consequently, if a message associated with multiple users is deleted by each of those users, then an attachment associated with the message is no longer accessible and/or otherwise traceable to an individual end-user because the decryption key is no longer available.

In one embodiment, a reference counter keeps track of the number of messages that are associated with an attachment. Once a message is deleted, the reference count is decremented. If the message is forwarded to another user, the reference count is incremented. In the reference count is zero, then the attachment is no longer associated with any messages and thus, can be deleted.

The techniques introduced herein can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary channels or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to various embodiments," "in the embodiments shown," "in other embodiments," and the like generally mean the particular feature, structure, or characteristic following the phrase is included in at least one embodiment of the present invention and may be included in more than one embodiment of the present invention. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "module" or "engine" refers broadly to software, hardware, or firmware (or any combination thereof) components. Modules or engines are typically functional components that can generate useful data or other output using specified input(s). A module may or may not be self-contained. An application program (also called an "application") may include one or more modules, or a module can include one or more application programs.

The terms "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

I. Environment

FIG. 1 depicts a block diagram illustrating an example of a networked-based environment 100 in which some embodiments of the present invention may be utilized. Companies can generate and store data (e.g., photographs, messages, e-mails, electronic documents, or healthcare records) and related analytics (e.g., usage analytics), which can contain user identifiable information (UII). The data can be submitted through various management tools 110, user devices 115, mobile devices 120, personal computers 125, laptops 130, and/or other devices to allow the data to be stored on one or more databases 135 and 140. As illustrated in FIG. 1, these devices and tools may use network 145 to submit and retrieve information from the databases 135 and 140. Various embodiments of the present invention use storage management system 150 within storage management infrastructure 155 to delete messages and manage attachments that are stored on databases 135 and 140.

User device 115 can be any computing device capable of receiving user input as well as transmitting and/or receiving data via the network 145. In one embodiment, user device 115 is a conventional computer system, such as a desktop 125 or laptop computer 130. In another embodiment, user device 115 may be mobile device 120 having computer functionality, such as a personal digital assistant (PDA), mobile telephone, smart-phone or similar device. User device 115 is configured to communicate with storage management system 150, and/or the financial account provider via the network 145. In one embodiment, user device 115 executes an application allowing a user of user device 115 to interact with the storage management system 150. For example, user device 115 can execute a browser application to enable interaction between the user device 115 and storage management system 150 via the network 145. In another embodiment, user device 115 interacts with storage management system 150 through an application programming interface (API) that runs on the native operating system of the user device 208, such as iOS® or ANDROID™.

User device 115 can be configured to communicate via the network 145, which may comprise any combination of local area and/or wide area networks, using both wired and wireless communication systems. In one embodiment, network 145 uses standard communications technologies and/or protocols. Thus, network 145 may include links using technologies such as Ethernet, 802.11, worldwide interoperability for microwave access (WiMAX), 3G, 4G, CDMA, digital subscriber line (DSL), etc. Similarly, the networking protocols used on network 145 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 145 may be represented using technologies and/or formats including hypertext markup language (HTML) or extensible markup language (XML). In addition, all or some of the links can be encrypted using conventional encryption technologies such as secure sockets layer (SSL), transport layer security (TLS), and Internet Protocol security (IPsec).

Figure 2:
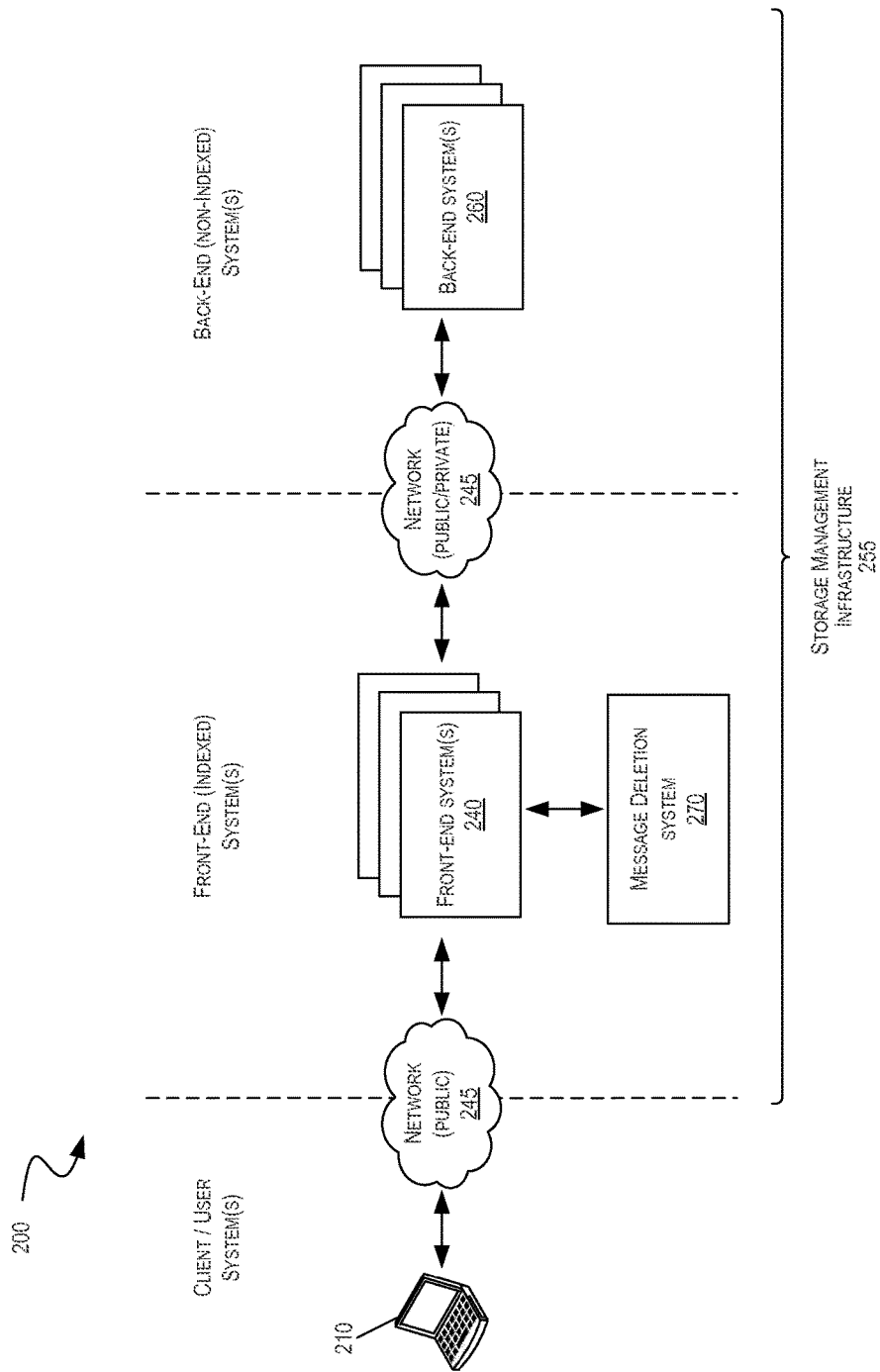
FIG. 2 depicts a block diagram illustrating an example of a storage infrastructure.

FIG. 2 depicts a block diagram illustrating a more detailed example of a storage management infrastructure 255 in a networked-based example environment 200, according to an embodiment. The storage management infrastructure 255 and the networked-based example environment 200 can be the storage management infrastructure 155 and the networked-based example environment 100 of FIG. 1, respectively, although other configurations are possible. As shown, the networked-based example environment 200 includes various client or user system(s) and a storage management infrastructure 255.

The storage management infrastructure 255 can include various front-end system(s) and back-end system(s) that can be physically and/or functionally distributed. As shown, the storage management infrastructure 255 includes front-end systems 240, a back-end data warehouse 260, and a message deletion system 270. The client or user system(s) 210 can be configured to communicate via the network 245 with the front-end system(s) 240, the front-end system(s) can be configured to communicate with the client or user system(s) 210 and the data warehouse 260 via the network 245, and the data warehouse 260 can be configured to communicate with the front-end system(s) 240 via the network 245. Additionally, the front-end system(s) 240 can be configured to communicate with the message deletion system 270. This communication can occur either via the network 245 or via other means including direct connections.

The front-end system(s) 240 can comprise various operational systems and/or relational or non-relational databases. The operational systems are typically optimized for preservation of data integrity and speed of recording transactions through use of database normalization and an entity-relationship model. Fully normalized database designs often result in information being stored in hundreds or even thousands of tables. Relational databases are efficient at managing the relationships between these tables. The databases have fast insert/update performance because only a small amount of data in those tables is affected each time a transaction is processed. For performance and other purpose, older data is periodically purged from the front-end (operational) system(s) 240 to the data warehouse 260. In one or more embodiments, the front-end system(s) 240 include, but are not limited to, user databases, HBASE, Haystack, and server logs.

The message deletion system 270 can comprise various processing systems, index server(s), etc., that perform the various management, and/or deletion procedures discussed herein. The various components, functions, and or tools that can be associated with and/or included within a deletion management system are discussed in greater detail with reference to FIG. 3. Additionally, although shown as physically and/or functionally distinct from the front-end system(s) 240, in some embodiments, some or all of the functionally associated with the message deletion system 270 can be included within one or more of the front-end system(s) 240.

The back-end data warehouse 260 is a "functionally" central repository for data that is purged from multiple front-end (operational) system(s) 240. The back-end data warehouse 260 is "functionally" central because it can be physically and/or functionally distributed. For example, the back-end data warehouse 260 can include a user space for server logs associated with end-user data that can be sharded across any number of physical distributed machines. The back-end data warehouse 260 can store current as well as historical data. For example, the back-end data warehouse 260 can store historical user data that is ten years or older. The back-end data warehouse 260 is commonly used for operational and development purposes including, but not limited to, data analysis.

The back-end data warehouse 260 may take a variety of forms. In one embodiment, the back-end data warehouse 260 is configured with Hive. Hive is a data warehouse system for HDFS that facilitates easy data summarization, ad-hoc queries, and the analysis of large datasets stored in Hadoop compatible file systems. However, as discussed above, data in Hadoop (as well as some other systems) is stored as files rather than as a database structure.

Figure 3:
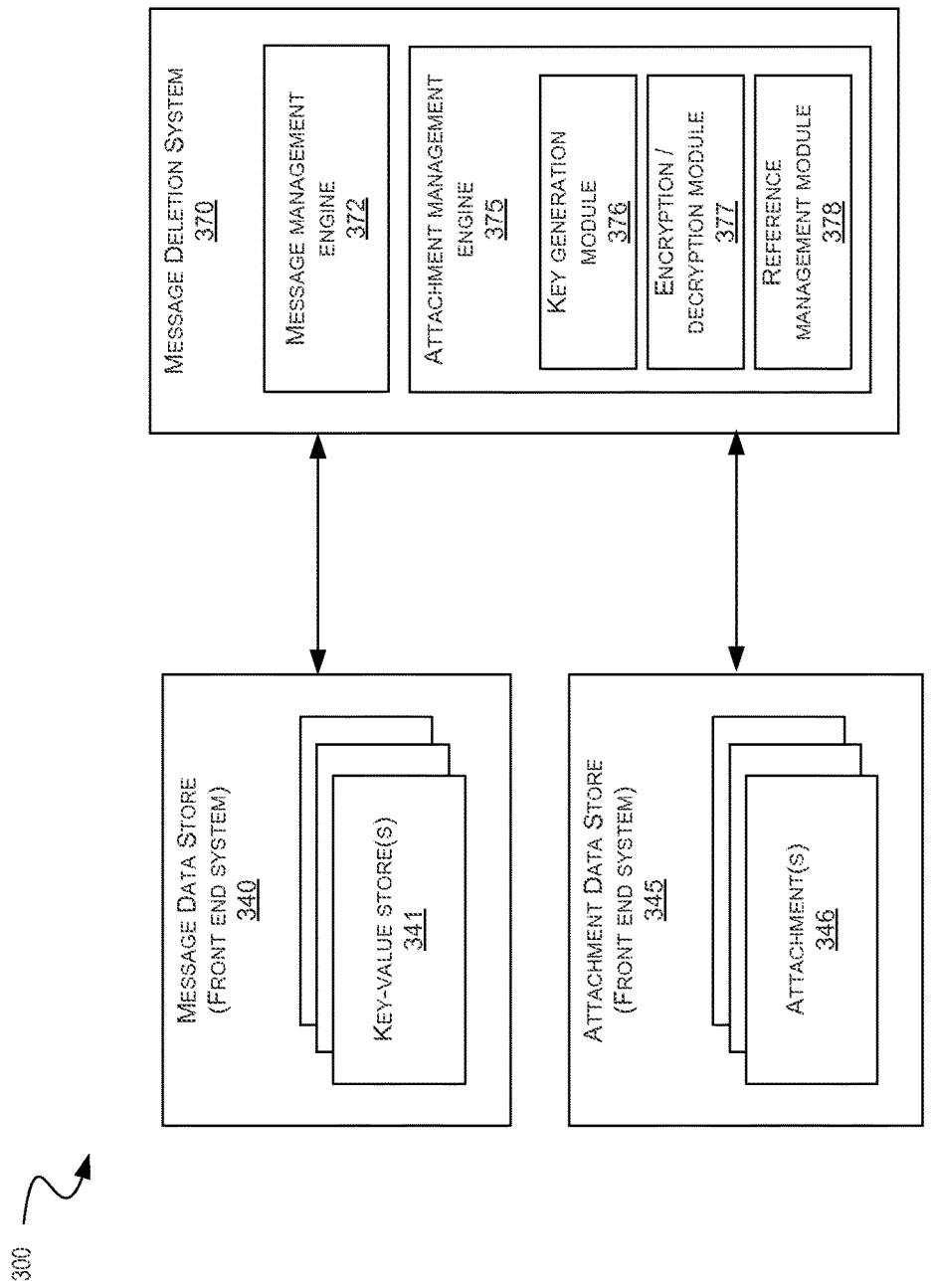
FIG. 3 depicts a block diagram illustrating the an example front-end storage infrastructure.

FIG. 3 depicts a block diagram illustrating a front-end storage infrastructure 300, according to an embodiment. The storage infrastructure 300 can be the storage infrastructure 155 of FIG. 1, although alternative configurations are possible. In the example of FIG. 3, the storage infrastructure 300 includes a message data store (or messaging platform) 340, an attachment data store (or attachment platform) 345, and a message deletion system 370. Other systems, databases, and/or components, although not shown, are possible.

The message data store 340 can be configured to store, manage and provide end-users with messages, message threads, and/or other message information. The message data store 340 can include various distributed components (physically distributed and/or functionally distributed). Alternatively, the message data store 340 can be implemented as a collective element. As shown, the message data store 340 includes one or more key-value store(s) 341. In one embodiment, the message data store 340 can be implemented in HBase. HBase is an open source, non-relational, distributed database modeled after Google's BigTable. HBase is developed as part of Apache Software Foundation's Apache Hadoop project and runs on top of HDFS (Hadoop Distributed Filesystem). HBase provides BigTable-like capabilities for Hadoop. That is, HBase provides a fault-tolerant technique for storing large quantities of sparse data. HBase features compression, in-memory operation, and Bloom filters on a per-column basis. Tables in HBase can serve as the input and output for MapReduce jobs running in Hadoop, and may be accessed through the Java Application Programming Interface (API) but also through REST, Avro or Thrift gateway APIs.

In one embodiment, the key-value store(s) 341 may comprise one or more tables in HBase. For example, HBase can be conceptualized as including a durational key-value store with each value being structured. Any number of column families can be defined for the key-value store(s) 341. Additionally, each value of the key-value store can be indexed by a key and structured to include multiple portions associated with multiple column families. The keys may be, for example, user identifier (UIDs) or other system or mailbox identifiers. An example key-value store 341 is shown and discussed in greater detail with respect to FIG. 8.

As discussed, each value in the key-value store is structured and atomic. That is, each value can be structured into multiple portions associated with the multiple column families. The value is said to be atomic because if more than one of the portions of the value are written, the system guarantees that the writes to the portions all succeed or all fail. However, there is no atomicity guarantee across keys. That is, if portions of a first value associated with a first key are written and portions of a second value associated with a second key are written, then the write to the first value may succeed while the write to the second value fails. To maintain atomicity, therefore, each value of the key-value store can represent an end-user's entire mailbox.

The column families can include an actions column family. The actions column portion of each value associated with the action column family is essentially an actions log for a specific end-user associated with a key (e.g., a UID). The actions log can be comprised of many log mutations with timestamps indicating the time one or more of the portions of the value changes. The actions portion can also include one or more checkpoints. The checkpoints can be used to identify specific points in the action log for replay. For example, without the checkpoints, every time an end-user loads his or her mailbox, the system will need to read the actions log from the beginning and replay the actions log until the mailbox tape (information) that can be displayed to the end-user is determined. This could involve reading all or most of the actions log—a process that can take on the order of tens of hours for heavy messaging end-users. Thus, the checkpoints provide for indications of one or more snapshots or common flows that can be used to speed up or eliminate some or all of the replay process. The snapshots or common flows may be stored in various other portions of the key-value store and associated with various other column families.

A common flow may be a flow that is common to end-users that access messaging accounts from a mobile website, a standard website, another tool, etc. For example, a common flow may comprise the process of accessing messages given a message thread identifier (ID). That is, the common flow may, for example, show all of the messages associated with the message thread ID, the last forty messages, the last five unread messages, etc. Any number of columns for common flows may be included in the key-value store 341.

Additionally, the column families can have associated polices such as, for example, retention policies. In one embodiment, a deletion column family having an associated retention policy for data stored therein is defined. In this case, messages and/or other message information stored in the deletion portion of a particular structured value is temporarily accessible from the key-value store during a retention period but removed after the retention period has elapsed. The retention period may take advantage of the log mutations with timestamps to delete or otherwise remove information stored in the deletion column family in a timely manner.

In one embodiment, a hold column family with an unlimited retention period is defined. Messages and/or message information stored in the hold or portion may be held indefinitely even if an end user has requested to remove the information. The hold column may be used if, for example, a legal hold is placed on the mailbox of a particular user. In this case all messages and/or message threads would be written to and/or otherwise stored in the hold portion of the value.

As discussed above, the message data store 340 can include various message information. The message information can include attachment information associated with messages stored thereon. The attachment information can, among other information, include encryption keys and pointers. For example, in one embodiment, message attachments can be encrypted and stored in an attachment data store 345. Encryption keys and pointers to the attachments are stored with the associated message. Consequently, if all messages that reference a particular message attachment are removed, then the attachment can no longer be decrypted. Alternatively or additionally, data objects can be referenced with the messages. The data objects can track the number of references (messages) that are associated with a particular attachment. Consequently, when the reference count hits zero, the attachment can be removed.

The attachment data store 345 can be configured to store, manage and provide end-users with message attachments. The attachment data store 345 can include various distributed components (physically distributed and/or functionally distributed). Alternatively, the attachment data store 345 can be implemented as a collective element. As shown, the attachment data store 345 includes one or more attachments 346. In one embodiment, the attachment data store can be implemented in Haystack which can also be used by a system to store other information (e.g., large files) such as, for example, images and/or image information.

The message deletion system 370, although illustrated as comprised of distributed components (physically distributed and/or functionally distributed), could be implemented as a collective element. In some embodiments, some or all of the modules, and/or the functions represented by each of the modules, can be combined in any convenient or known manner. Furthermore, the functions represented by the modules and/or engines can be implemented individually or in any combination thereof, partially or wholly, in hardware, software, or a combination of hardware and software.

The message deletion system 370 includes a message management engine 372 and an attachment engine 375. The message management engine 372 is configured to manage, process, and/or otherwise handle end-user messages, message threads, and/or other message information. More specifically, the message management engine 372 performs the all of the message and message thread deletion tasks described herein.

The attachment management engine 375 is configured to manage, process, and/or otherwise handle message attachments. The attachment management engine 375 includes a key generation module 376, an encryption/decryption module 377, and a reference management module 378. The key generation module 376 is configured to generate an encryption key for message attachments. The encryption key can be any type of encryption key known in that art. Alternatively, the key generation module 376 can request a new encryption key be generated.

The encryption/decryption module 377 is configured to encrypt new attachments using the encryption key. The encryption/decryption module 377 is also configured to decrypt encrypted attachments using an encryption key. As discussed above, encrypted attachments are stored in the attachment data store 345. One or more messages associated with the attachment is stored in the message data store 340. The encryption key is stored with the messages. Thus, once all of the messages are deleted, the attachment is no longer decryptable.

As an alternative to or in addition to encrypting the attachments, the reference management module 387 can be used to track references to attachments. For example, the reference management module 387 may interact with and/or maintain objects that track the reference count. Once all references to an attachment are deleted, so too can the attachment be deleted.

Figure 4:
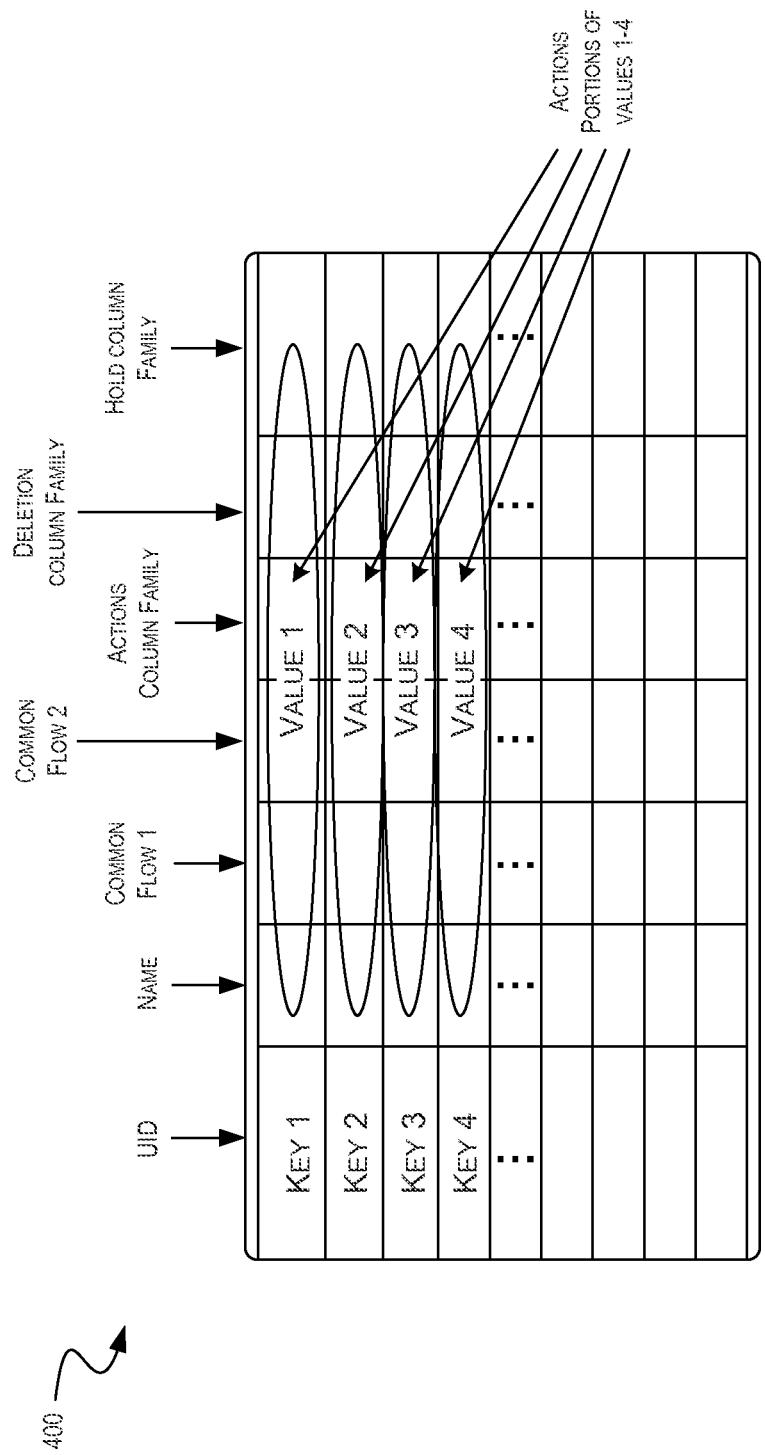
FIG. 4 depicts an example key-value store having various column families.

FIG. 4 depicts an example key-value store 400 having various columns, according to an embodiment. Table data 400 is generally self-explanatory based on the above detailed description, but some details will now be provided.

Table 400 includes a plurality of columns and rows. In this example, each row (or key) represents data associated with a particular user or UID and each column identifies the particular information that is stored for that user. More specifically, each row represents a mailbox associated with a user. In example table 400, the following columns are shown: UID (the key), name, common flow 1, common flow 2, actions column family, deletion column family, and hold column family. Additional or fewer columns are possible.

II. Methods for Message Deletion

Figure 5:
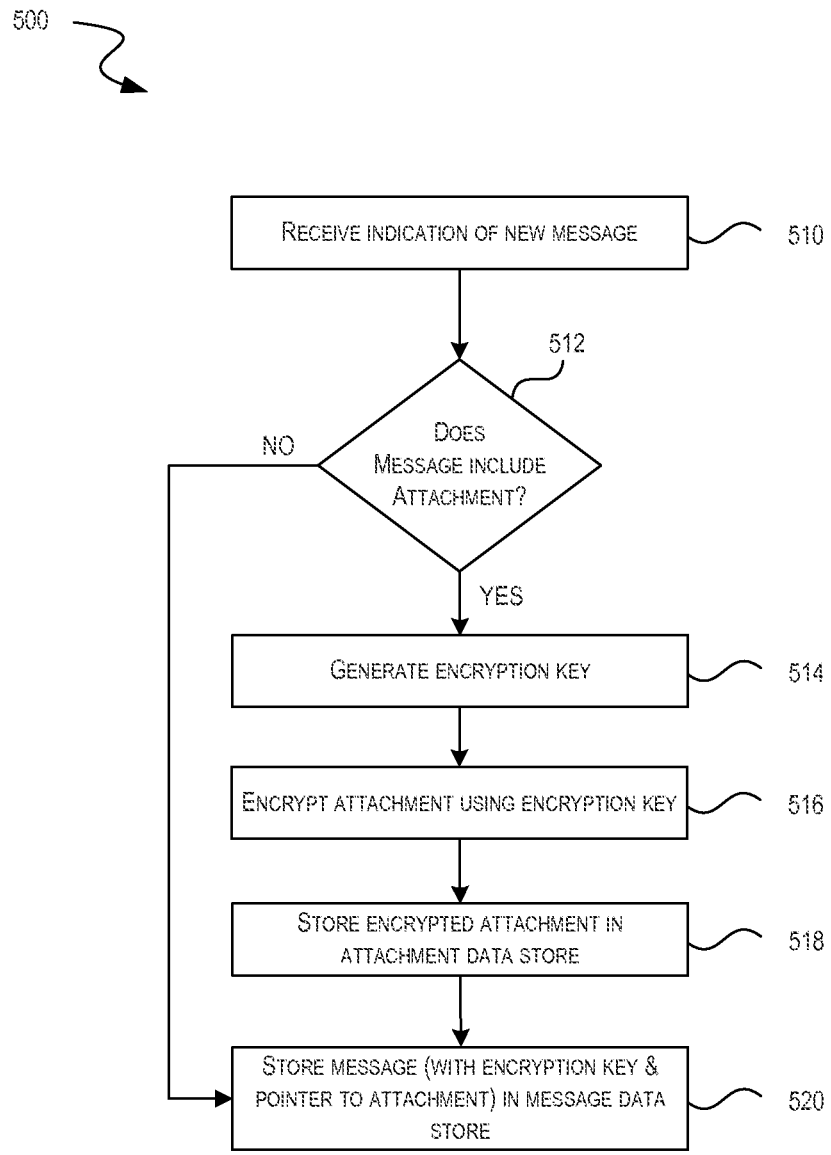
FIG. 5 depicts a flowchart illustrating an example process for encrypting and storing a new message in a message data store.

FIG. 5 depicts a flowchart illustrating an example process 500 for encrypting and storing a new message in a message data store and managing an attachment in an attachment data store, according to an embodiment. The operations illustrated in FIG. 5 may be performed in various embodiments by a message deletion system 270 of FIG. 2, a processor, and/or other modules, engines, components or tools associated with storage management system 150 of FIG. 1. Other configurations are also possible.

To begin, at step 510, the message deletion system receives indication of a new message. At a determination step 512, the message deletion system determines if the new message includes an attachment. The attachment can be any data such as, for example, audio files, image files, video files, etc. If the new message does include an attachment, at step 514, the message deletion system generates an encryption key. At step 516, the message deletion system, encrypts the attachment using the encryption key and, at step 518, stores the encrypted attachment in the attachment data store. Lastly, at step 520, the message deletion system stores the new message. If the new message included an attachment, then the message is stored with an encryption key and a pointer to the attachment in the attachment data store. As discussed above, the encryption key is used to decrypt the attachment.

Figure 6:
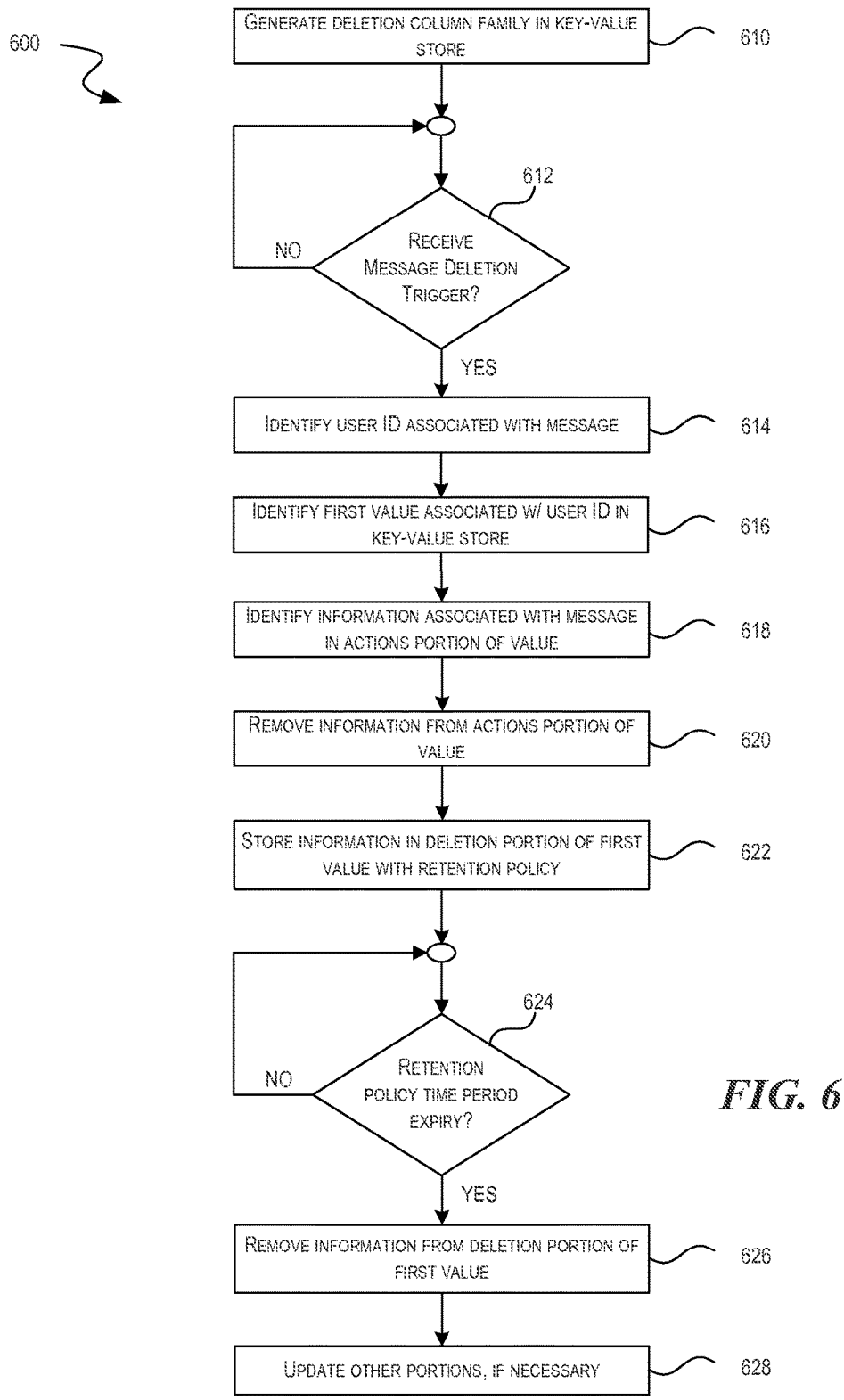
FIG. 6 depicts a flowchart illustrating an example process for removing a message from a message data store.

FIG. 6 depicts a flowchart illustrating an example process 600 for removing a message from a message data store, according to an embodiment. The operations illustrated in FIG. 6 may be performed in various embodiments by a message deletion system 270 of FIG. 2, a processor, and/or other modules, engines, components or tools associated with storage management system 150 of FIG. 1.

To begin, at step 610, the message deletion system generates a deletion column family in a key-value store. The deletion column family has a defined or associated retention policy for data stored therein. That is, messages and/or other message information stored in the deletion portion of a particular structured value associated with an end-user is temporarily accessible from the key-value store during a retention period but removed after the retention period has elapsed. As discussed above, the retention period may take advantage of the log mutations with timestamps to delete or otherwise remove information stored in the deletion column family in a timely manner.

At a decision step 612, the message deletion system determines whether a message deletion trigger has been received. The message deletion trigger can be any indicator to commence deletion of a message in the message data store. The message deletion trigger can include a message identifier (ID) and/or a user identifier (UID). The message deletion trigger may be received responsive to reception of a request from an end-user and/or a request from another component or module. For instance, when threads are deleted, a thread deletion component will call the deletion operation or trigger for each message in the thread.

At step 614, the message deletion system identifies and/or otherwise determines the UID associated with the message. In some cases the UID can be determined based on the message ID; however, the UID may also be determined in other ways and/or be included with the message. At step 616, the message deletion system identifies and/or otherwise determines the first value associated with the UID in a key-value store. The UID can be used as a key into a key-value store. In this example, the first value represents the contents of a mailbox associated with a user that is identified by the UID.

Once the value is identified and/or otherwise determined, at step 618, the message deletion system identifies and/or otherwise determines information associated with the message in an actions portion of the value. Each value can include multiple portions each associated with a column family. The column families can be defined for the entire key-value store. The actions column portion of each value associated with the action column family is essentially an actions log for a specific end-user associated with a key (e.g., a UID). The actions log can be comprised of many log mutations with timestamps indicating the time one or more of the portions of the value changes. The actions portion can also include one or more checkpoints. As discussed above, the checkpoints can be used to identify specific points in the action log for replay.

At step 620, the message deletion system removes the information associated with the message from the actions portion of the value. At step 622, the message deletion system information stores and/or otherwise writes the information associated with the message from the actions portion of the value to the deletion portion of the first value. As discussed above, deletion portion of the value has an associated retention policy. At a decision step 624, the message deletion system determines if a time period associated with the retention policy has expired and, if so, at step 626 the message deletion system removes the information associated with the message from the deletion portion of the value.

Lastly, at step 628, the message deletion system updates other portions in the key-value store, if necessary. For example, the actions portion may include only metadata. In this case, the messages themselves and/or other information associated with the message needs to be deleted from one or more portions of the first value.

Figure 7:
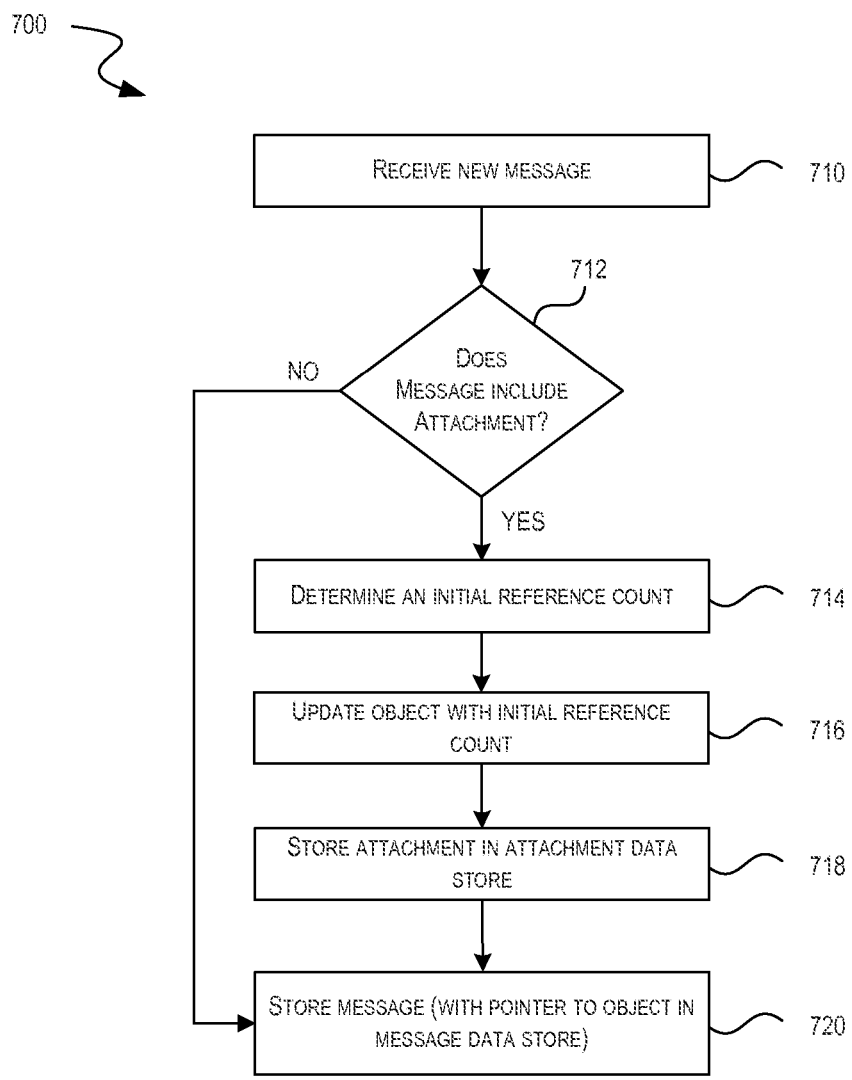
FIG. 7 depicts a flowchart illustrating an example process for receiving a new message in a message data store with reference counting.

FIG. 7 depicts a flowchart illustrating an example process 700 for receiving a new message in a message data store with reference counting, according to an embodiment. The operations illustrated in FIG. 7 may be performed in various embodiments by a message deletion system 270 of FIG. 2, a processor, and/or other modules, engines, components or tools associated with storage management system 150 of FIG. 1.

To begin, at step 710, the message deletion system receives indication of a new message. At a determination step 712, the message deletion system determines if the new message includes an attachment. The attachment can be any data such as, for example, audio files, image files, video files, etc. If the new message does include an attachment then, at step 714, the message deletion system determines an initial reference count. That is, the message deletion system determines the number of messages that reference the attachment. As discussed above, a message from a first end-user to a second end-user can comprise two messages in the message data store—one for each end user. Both of the messages reference the attachment. Therefore, both messages need to be deleted before the attachment can be deleted.

At step 716, the message deletion system updates and/or otherwise notifies an object of the reference count. At step 718, the message deletion system stores the attachment in the attachment data store. Lastly, at step 720, the message deletion system stores the new message in the message data store. If the new message included an attachment, then the message is stored with a pointer to the object tracking the reference count.

Figure 8:
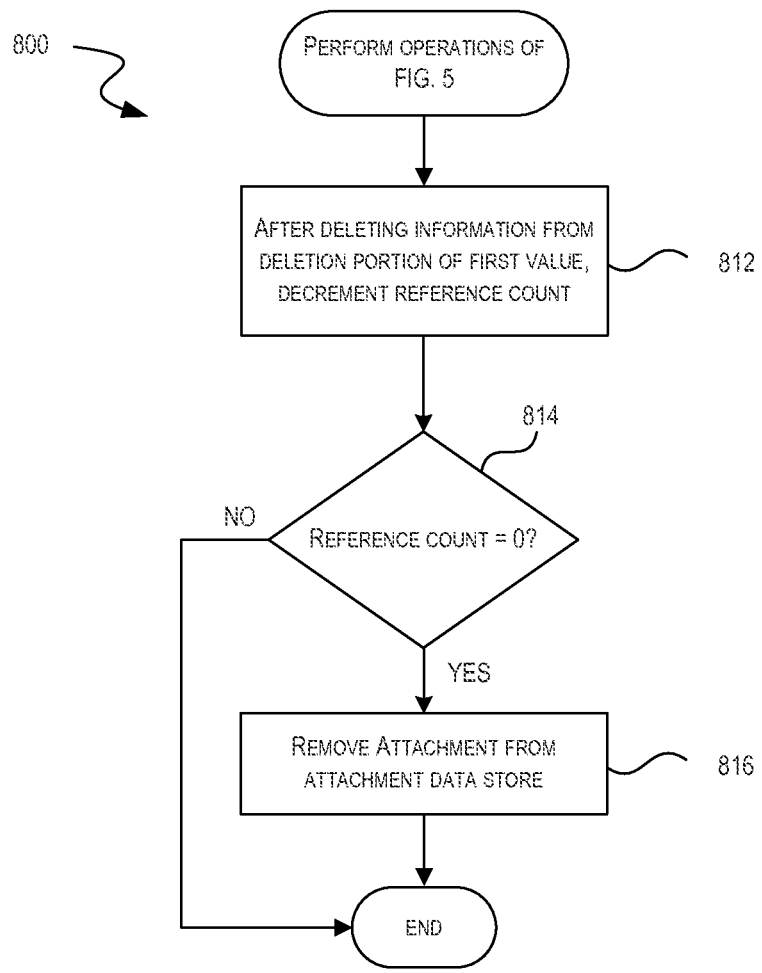
FIG. 8 depicts a flowchart illustrating an example process for removing a message with an attachment from a message data store with reference counting.

FIG. 8 depicts a flowchart illustrating an example process 800 for removing a message with an attachment from a message data store with reference counting, according to an embodiment. The operations illustrated in FIG. 8 may be performed in various embodiments by a message deletion system 270 of FIG. 2, a processor, and/or other modules, engines, components or tools associated with storage management system 150 of FIG. 1.

To begin, the operations of FIG. 5 are performed. At step 812, after deleting information from a deletion portion of the first value, the message deletion system decrements the reference count. Alternatively, the message deletion system may direct an object to decrement the count. At decision step 814, the message deletion system determines if the reference count is zero. If the reference count is zero, then there are no more messages that reference the attachment and thus, at step 816, the message deletion system can remove the attachment from the attachment data store.

III. Social Networking System Overview

Figure 9:
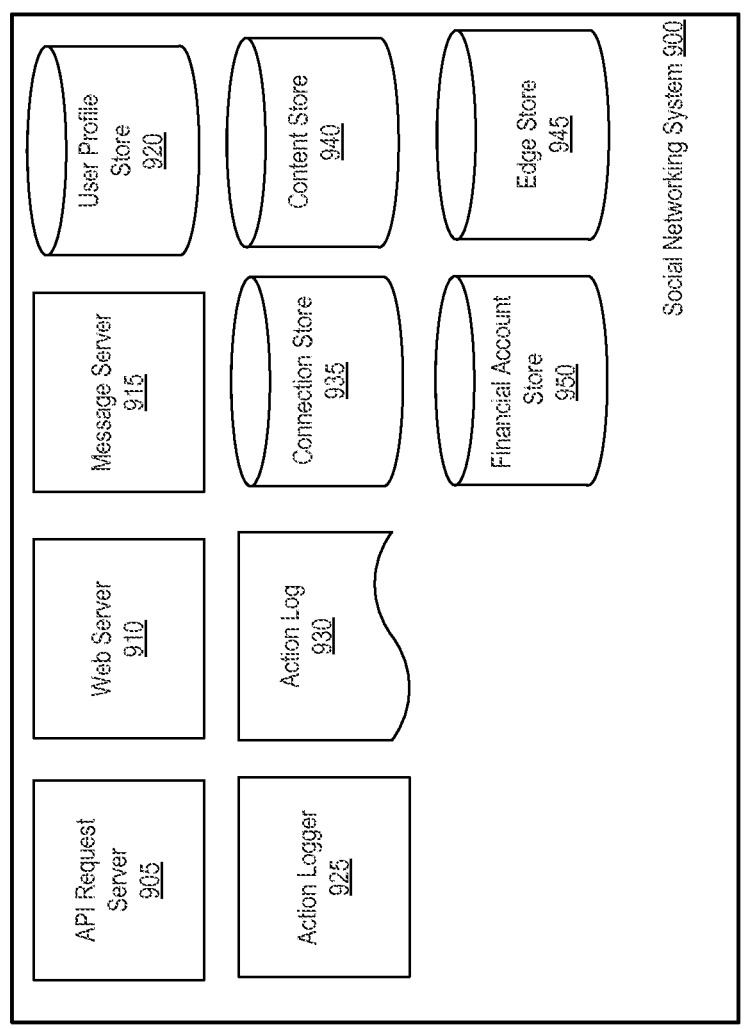
FIG. 9 is a block diagram of a system architecture of the social networking system with which some embodiments of the present invention may be utilized.

FIG. 9 is a block diagram of a system architecture of the social networking system 900 with which some embodiments of the present invention may be utilized. Social networking system 900 illustrated by FIG. 9 includes API request server 905, web server 910, message server 915, user profile store 920, action logger 925, action log 930, connection store 935, content store 940, edge store 945, and financial account store 950. Although not shown, some or all of the servers/stores etc., may comprise the storage management system discussed herein. In other embodiments, social networking system 900 may include additional, fewer, or different modules for various applications. Conventional components such as network interfaces, security mechanisms, load balancers, failover servers, management and network operations consoles, and the like are not shown so as to not obscure the details of the system architecture.

API request server 905 allows other systems, user devices, or tools to access information from social networking system 900 by calling APIs. The information provided by the social network may include user profile information or the connection information of users as determined by their individual privacy settings. For example, a system, user device, or tools interested in accessing data connections within a social networking system may send an API request to social networking system 900 via a network. The API request is received at social networking system 900 by API request server 905.

Web server 910 links social networking system 900 via a network to one or more client devices; the web server serves web pages, as well as other web-related content, such as Java, Flash, XML, and so forth. The web server 910 may communicate with the message server 915 that provides the functionality of receiving and routing messages between social networking system 900 and client devices. The messages processed by message server 915 can be instant messages, queued messages (e.g., email), text and SMS (short message service) messages, or any other suitable messaging technique. In some embodiments, a message sent by a user to another can be viewed by other users of social networking system 900, for example, by the connections of the user receiving the message. An example of a type of message that can be viewed by other users of the social networking system besides the recipient of the message is a wall post. In some embodiments, a user can send a private message to another user that can only be retrieved by the other user.

Each user of the social networking system 900 is associated with a user profile, which is stored in user profile store 920. A user profile includes declarative information about the user that was explicitly shared by the user, and may also include profile information inferred by social networking system 900. In one embodiment, a user profile includes multiple data fields, each data field describing one or more attributes of the corresponding user of social networking system 900. The user profile information stored in user profile store 920 describes the users of social networking system 600, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of social networking system 900 displayed in an image. A user profile in user profile store 920 may also maintain references to actions by the corresponding user performed on content items in content store 940 and stored in the edge store 945.

A user profile may be associated with one or more financial accounts, allowing the user profile to include data retrieved from or derived from a financial account. A user may specify one or more privacy settings, which are stored in the user profile, that limit information from a financial account that social networking system 900 is permitted to access. For example, a privacy setting limits social networking system 900 to accessing the transaction history of the financial account and not the current account balance. As another example, a privacy setting limits social networking system 900 to a subset of the transaction history of the financial account, allowing social networking system 900 to access transactions within a specified time range, transactions involving less than a threshold transaction amounts, transactions associated with specified vendor identifiers, transactions associated with vendor identifiers other than specified vendor identifiers or any suitable criteria limiting information from a financial account identified by a user that is accessible by a social networking system 900. In one embodiment, information from the financial account is stored in user profile store 920. In other embodiments, it may be stored in financial account store 950.

Action logger 925 receives communications about user actions on and/or off social networking system 900, populating action log 930 with information about user actions. Such actions may include, for example, adding a connection to another user, sending a message to another user, uploading an image, reading a message from another user, viewing content associated with another user, attending an event posted by another user, among others. In some embodiments, action logger 925 receives, subject to one or more privacy settings, transaction information from a financial account associated with a user and identifies user actions from the transaction information. For example, action logger 925 retrieves vendor identifiers from the financial account's transaction history and identifies an object, such as a page, in social networking system 900 associated with the vendor identifier. This allows action logger 925 to identify a user's purchases of products or services that are associated with a page, or another object, in content store 940. In addition, a number of actions described in connection with other objects are directed at particular users, so these actions are associated with those users as well. These actions are stored in action log 930.

Action log 930 may be used by social networking system 900 to track user actions on social networking system 900, as well as external website that communicate information to social networking system 900. Users may interact with various objects on social networking system 900, including commenting on posts, sharing links, and checking-in to physical locations via a mobile device, accessing content items in a sequence or other interactions. Information describing these actions is stored in action log 930. Additional examples of interactions with objects on social networking system 900 included in action log 930 include commenting on a photo album, communications between users, becoming a fan of a musician, adding an event to a calendar, joining groups, becoming a fan of a brand page, creating an event, authorizing an application, using an application and engaging in a transaction. Additionally, action log 930 records a user's interactions with advertisements on social networking system 900 as well as other applications operating on social networking system 900. In some embodiments, data from action log 930 is used to infer interests or preferences of the user, augmenting the interests included in the user profile and allowing a more complete understanding of user preferences.

Action log 930 may also store user actions taken on external websites and/or determined from a financial account associated with the user. For example, an e-commerce website that primarily sells sporting equipment at bargain prices may recognize a user of social networking system 900 through social plug-ins that enable the e-commerce website to identify the user of social networking system 900. Because users of social networking system 900 are uniquely identifiable, e-commerce websites, such as this sporting equipment retailer, may use the information about these users as they visit their websites. Action log 930 records data about these users, including webpage viewing histories, advertisements that were engaged, purchases made, and other patterns from shopping and buying. Actions identified by action logger 925 from the transaction history of a financial account associated with the user allow action log 630 to record further information about additional types of user actions.

Content store 940 stores content items associated with a user profile, such as images, videos or audio files. Content items from content store 940 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social network system by displaying content related to users, objects, activities, or functionalities of social networking system 900. Examples of social networking content items include suggested connections or suggestions to perform other actions, media provided to, or maintained by, social networking system 900 (e.g., pictures or videos), status messages or links posted by users to the social networking system, events, groups, pages (e.g., representing an organization or commercial entity), and any other content provided by, or accessible via, the social networking system.

Content store 940 also includes one or more pages associated with entities having user profiles in user profile store 920. An entity is a non-individual user of social networking system 900, such as a business, a vendor, an organization or a university. A page includes content associated with an entity and instructions for presenting the content to a social networking system user. For example, a page identifies content associated with the entity's user profile as well as information describing how to present the content to users viewing the brand page. Vendors may be associated with pages in content store 940, allowing social networking system users to more easily interact with the vendor via social networking system 900. A vendor identifier is associated with a vendor's page, allowing social networking system 900 to identify the vendor and/or to retrieve additional information about the vendor from user profile store 920, action log 930, or from any other suitable source using the vendor identifier. In some embodiments, the content store 940 may also store one or more targeting criteria associated with stored objects and identifying one or more characteristics of a user to which the object is eligible to be presented.

In one embodiment, edge store 945 stores the information describing connections between users and other objects on social networking system 900 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in social networking system 900, such as expressing interest in a page on the social networking system, sharing a link with other users of the social networking system, and commenting on posts made by other users of the social networking system. Edge store 945 stores edge objects that include information about the edge, such as affinity scores for objects, interests, and other users. Affinity scores may be computed by social networking system 900 over time to approximate a user's affinity for an object, interest, and other users in social networking system 900 based on the actions performed by the user. Multiple interactions between a user and a specific object may be stored in one edge object in edge store 945, in one embodiment. In some embodiments, connections between users may be stored in user profile store 920, or user profile store 920 may access edge store 945 to determine connections between users.

IV. Computer System Overview

Figure 10:
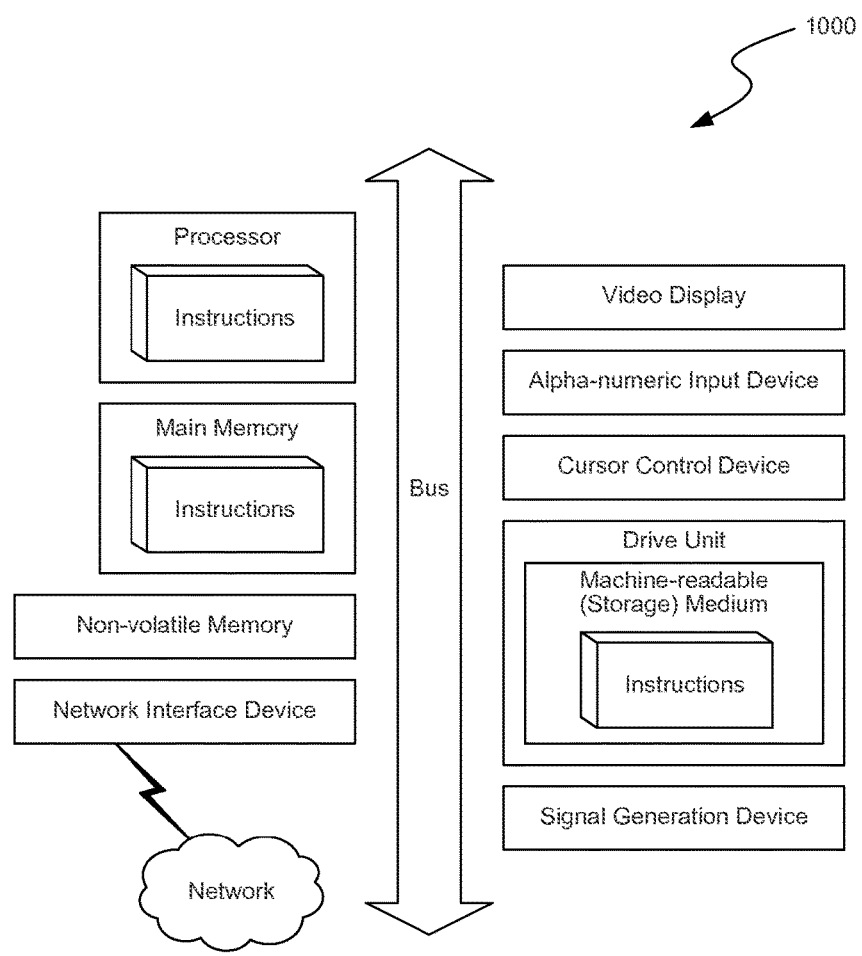
FIG. 10 shows a diagrammatic representation of a machine in the example form of a computer system.

FIG. 10 shows a diagrammatic representation of a machine in the example form of a computer system 1000, within which a set of instructions for causing the machine to perform any one or more of the methodologies discussed herein may be executed.

In alternative embodiments, the machine operates as a standalone device or may be connected (networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone or smart phone, a tablet computer, a personal computer, a web appliance, a point-of-sale device, a network router, switch or bridge, or any machine capable of executing a set of instructions (sequential or otherwise) that specify actions to be taken by that machine.

While the machine-readable (storage) medium is shown in an exemplary embodiment to be a single medium, the term "machine-readable (storage) medium" should be taken to include a single medium or multiple media (a centralized or distributed database, and/or associated caches and servers) that store the one or more sets of instructions. The term "machine-readable medium" or "machine readable storage medium" shall also be taken to include any medium that is capable of storing, encoding or carrying a set of instructions for execution by the machine and that cause the machine to perform any one or more of the methodologies of the present invention.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include, but are not limited to, recordable type media such as volatile and non-volatile memory devices, floppy and other removable disks, hard disk drives, optical disks (e.g., Compact Disk Read-Only Memory (CD ROMs), Digital Versatile Discs, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the disclosure.

What is claimed is:

1. A method, comprising:
receiving, by a message deletion module in a storage system, a request to delete a message associated with a first user of multiple users of the storage system;
identifying, by the message deletion module and based on a first key associated with the first user, a first value corresponding to the first user, the first value and the first key stored in a key-value store residing in computer memory on the storage system, wherein the first value represents a plurality of messages associated with the first user, wherein each key of the key-value store indicates one of the multiple users, and wherein each value of the key-value store is indexed by a key and structured to include multiple column portions that are associated with corresponding column families;
identifying, by the message deletion module, information associated with the message in an actions portion of the first value, the information including (a) an action log comprising a list of actions performed on the message and (b) attachment information, which includes an encryption key and a pointer, the encryption key comprising a key for decrypting an encrypted attachment and the pointer indicating a location of the encrypted attachment in an attachment data store;
removing, by the message deletion module, the information from the actions portion of the first value to be stored in a deletion portion of the first value, wherein the actions portion of the first value is associated with an actions column family; and
storing, by the message deletion module, the removed information in the deletion portion of the first value, wherein the deletion portion of the first value is associated with a deletion column family having an associated retention policy, wherein the action log is available in the storage system while the removed information is still stored in the deletion portion.

2. The method of claim 1, further comprising:
removing, by the message deletion module, the information associated with the message from the deletion portion of the first value after a time period specified by the retention policy.

3. The method of claim 1, wherein removing the information comprises replacing or redacting the information.

4. The method of claim 1, further comprising:
identifying, by the message deletion module, other information associated with the message in one or more other portions of the first value; and
removing, by the message deletion module, the other information from the other portions of the first value.

5. The method of claim 1, wherein removing the information associated with the message includes removing the encryption key and the pointer.

6. The method of claim 1, wherein the attachment information includes a pointer to an object configured to maintain a reference count associated with an attachment and a location of the attachment in an attachment data store.

7. The method of claim 6, further comprising:
removing, by the message deletion module, the information associated with the message from the deletion portion of the first value after a time period specified by the retention policy;
subsequent to the removing of information associated with the message from the deletion portion of the first value, decrementing, by the message deletion module, the reference count associated with the attachment;
determining, by the message deletion module, if the reference count is zero; and
removing, by the message deletion module, the attachment if the reference count is zero.

8. The method of claim 1, further comprising:
generating, by the message deletion module, a hold column family having an associated retention policy with an unlimited time period;
receiving, by the message deletion module, a request to hold a message associated with the first user; and
storing, by the message deletion module, the information associated with the message in a hold portion of the first value, wherein the hold portion of the first value is associated with the hold column family.

9. The method of claim 1, further comprising:
generating, by the message deletion module, the deletion column family having the associated retention policy in the key-value store.

10. The method of claim 1, wherein the first key comprises a user identifier (UID) that uniquely identifies the first user of the multiple users of the storage system, and wherein the storage system is part of a cloud-based social networking system.

11. The method of claim 1, wherein the message includes an associated message identifier.

12. A storage system, comprising:
a processor;
a memory device having a key-value store stored thereon, wherein each key of the key-value store indicates one of multiple users of the storage system, and wherein each value of the key-value store is indexed by a corresponding key and structured to include multiple column portions that are associated with corresponding column families;
a storage interface, operatively coupled to the processor, through which to access the memory device;
a network interface, operatively coupled to the processor, through which to receive one or more system requests; and
the memory device further having instructions stored thereon which, when executed by the processor, cause the storage system to:

identify a first value corresponding to a first user in the key-value store responsive to a system request to delete a message associated with the first user of the multiple users of the storage system, wherein the first value represents a plurality of messages associated with the first user, identify information associated with the message in an actions portion of the first value, the information including (a) an action log comprising a list of actions performed on the message and (b) attachment information, which includes an encryption key and a pointer, the encryption key comprising a key for decrypting an encrypted attachment and the pointer indicating a location of the encrypted attachment in an attachment data store, remove the information from the actions portion of the first value to be stored in a deletion portion of the first value, wherein the actions portion of the first value is associated with an actions column family, and store the removed information in the deletion portion of the first value associated with a deletion column family having an associated retention policy, wherein the action log is available in the storage system while the removed information is stored in the deletion portion, wherein the information in the deletion portion is automatically deleted after a time period specified by the retention policy.

13. The storage system of claim 12, wherein the information associated with the message includes attachment information associated with the message and the attachment information includes a pointer to an object configured to maintain a reference count associated with an attachment and a location of the attachment in an attachment data store.

14. The storage system of claim 12, wherein the instructions, when executed by the processor, further cause the system to:

remove the information associated with the message from the deletion portion of the first value after a time period specified by the retention policy;

subsequent to the removing of information associated with the message from the deletion portion of the first value, decrementing, by the message deletion module, the reference count associated with the attachment;

determine if the reference count is zero; and remove the attachment if the reference count is zero.

15. A method, comprising:

responsive to an occurrence of a triggering event, identifying, by a message deletion module of a storage system, a first message thread that is marked as deleted, wherein the first message thread is one of multiple message threads in a key-value store residing in computer memory on the storage system, wherein the identifying includes:

prior to the occurrence of the triggering event, receiving a request to delete the first message thread with an associated thread identifier (ID), and marking the thread as deleted;

identifying, by the message deletion module, metadata associated with the first message thread;

identifying, by the message deletion module, one or more messages associated with the first message thread using the metadata; and removing, by the message deletion module, each of the one or more messages by:

removing the message from an actions portion of a value in the key-value store, wherein the value represents a plurality of messages associated with a user corresponding to a key with which the value is associated, wherein the actions portion of the value is associated with an actions column family, wherein the actions portion of the value includes an action log comprising a list of actions performed on the message, wherein each key of the key-value store indicates one of multiple users of the storage system, and wherein each value of the key-value store is indexed by a key and structured to include multiple column portions associated with corresponding column families, and storing the removed message in a deletion portion of the first value, wherein the deletion portion of the first value is associated with a deletion column family having an associated retention policy, wherein the action log is available in the storage system while the removed message is still stored in the deletion portion.

16. The method of claim 15, wherein the triggering event comprises a cron job occurring periodically.

* * * * *